UNITED STATES PATENT OFFICE.

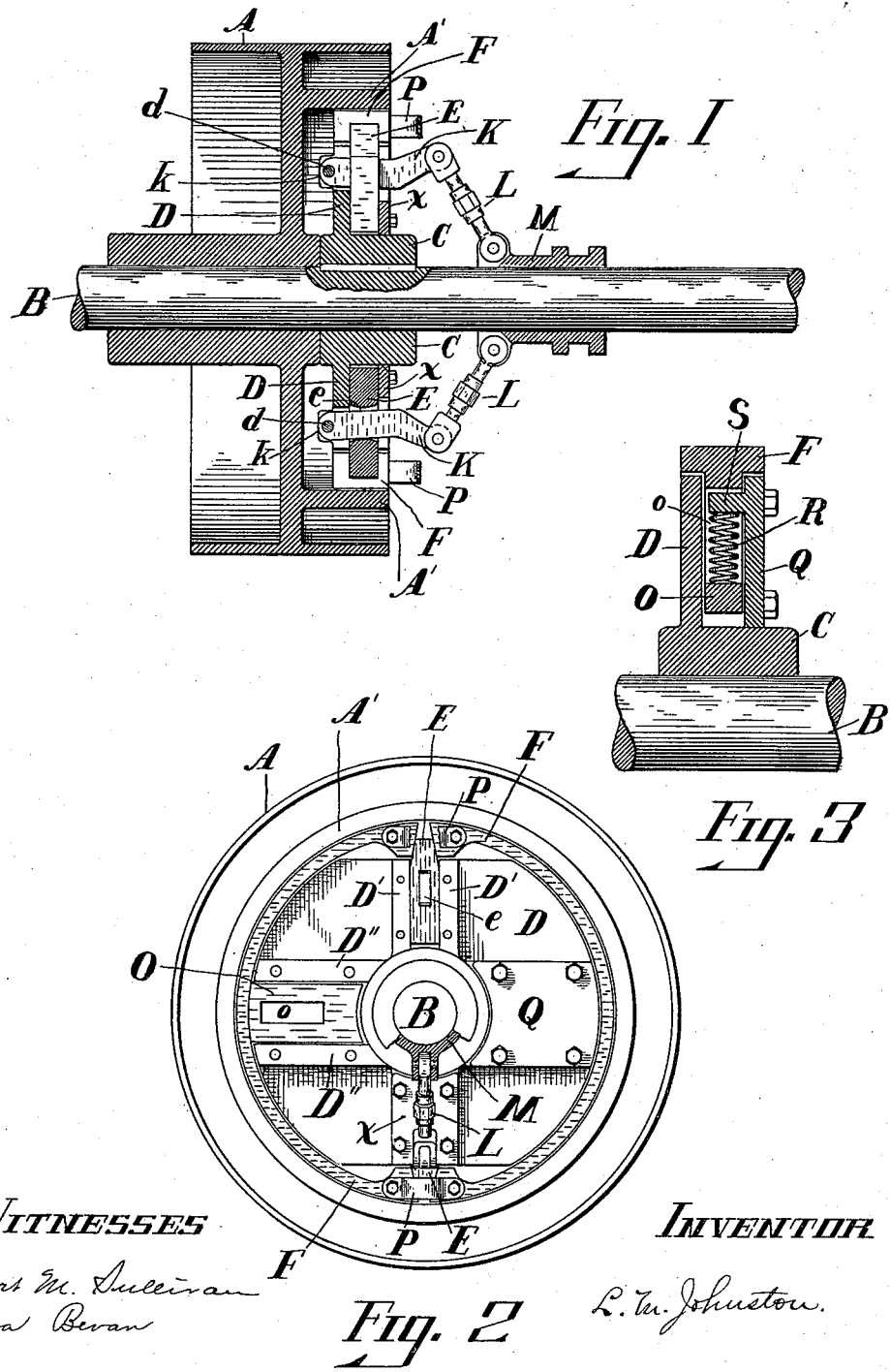

LAWRENCE M. JOHNSTON, OF DAYTON, OHIO, ASSIGNOR TO THE NEW ERA IRON WORKS COMPANY, OF SAME PLACE.

FRICTION-CLUTCH.

SPECIFICATION forming part of Letters Patent No. 572,205, dated December 1, 1896.

Application filed June 9, 1896. Serial No. 594,856. (No model.)

*To all whom it may concern:*

Be it known that I, LAWRENCE M. JOHNSTON, a citizen of the United States, and a resident of Dayton, in the county of Montgomery and State of Ohio, have invented certain new and useful Improvements in Friction-Clutches, of which the following is a full, clear, and exact description, reference being had to the accompanying drawings, forming part of this specification.

My invention relates to an improvement in friction-clutches adapted both for friction clutch-pulleys and friction-clutch cut-off couplings.

The novel features of my invention will be hereinafter set forth in the accompanying specification and drawings.

Figure 1 is a vertical section taken through the center of Fig. 2. Fig. 2 is a side elevation; and Fig. 3 is a detail drawing of the equalizing-spring.

In the drawings I have illustrated the clutch as applied to a pulley.

A is a drum or pulley of usual construction, having on its inner side a friction surface or ring A', the pulley itself being adapted to be mounted on a shaft or equivalent B. In the preferred construction, as shown, the pulley A is journaled loosely on the shaft and held against longitudinal movement by collars or in any convenient way. Within the pulley, attached rigidly to the shaft, is a plate D, having a hub C. Upon the surface of this plate are radial guides D' D' and D'' D''. Between the guides D' D' on the inner surface of the plate wedge-shaped castings or forgings E are arranged to move radially.

F F are the two halves or segments of a friction-clutch, with a V-shaped opening between their ends and on each half a slide-bar O, midway between their ends. The ends of these segments are held together by bow-shaped springs P, whose constant force is inward to bring the ends of the clutch F F together. These springs P draw the segments together to form a perfect circle, the outside diameter of which will be smaller than the inside diameter of the friction-ring when out of clutch or when running idle on a revolving shaft. The clutch, as shown and preferably used, is rigidly attached to a revolving shaft, and when out of clutch the centrifugal force would tend to throw the wedges E outward and force the segments apart. The bow-springs prevent this and also equalize the diameters of the clutch at all times. Should the two faces of the V-shaped opening be inexact from any cause, the springs P P, holding the two halves or segments elastically or yieldingly together, serve to even the pressure of the wedges on both segments, and permit the automatic equalizing of the pressure and adjustment of the parts, so as to produce at all times a substantially perfect circle.

The hinged arms K K are fulcrumed to the plate D at d and pass through slots e in the wedges E. The outer ends of these fulcrumed arms K K are hinged to the arm L L, whose opposite ends are pivoted to a collar M. As the collar M is moved toward the hub C, the ends of the arm K are forced outward, and with them the wedges E are driven into the V-shaped openings between the ends of the clutches F F, thus forcing them apart against the pressure of the spring P, increasing the diameter until the friction between the outer surface of the clutch F F and the inner surface of the friction-ring A' is sufficient. In order to equalize all of the diameters of the clutch F F and make them constant at all times, I provide at a point midway between their ends a spring-pressure whose constant force is toward the center or hub. Upon each of the halves F' F' of the clutch at a point midway between their ends is rigidly attached, cast integral therewith, a slide-bar O with a spring-pocket o, within which is placed a coiled spring R, Fig. 3. The inner end of this coiled spring R bears against the inner end of the slot o. Bolted on the guides D'' D'' is a plate Q, Figs. 2 and 3, and on the outer end of this plate is a lug S, bearing against the outer end of the spring R. The pressure of this spring R against the lug S on the plate Q, which is bolted to the guides on the plate D, which in turn is rigidly attached to the hub, gives a constant inward pull upon the friction-clutches at the point midway between their ends. Either the centrifugal force or gravity at certain points tends to cause the segments to bend slightly outward at their middle points, making the diameter of the clutch greater at that point. The coiled springs R R by a constant pull toward the center overcome this tendency and supplement the springs P P, producing a constant pull-in of all parts of the clutch toward a common center and preserving at all times a perfect circle.

On top of the guides D' D' and covering the wedges are bolted plates X, inclosing the wedges, but provided, of course, with a slot for the movement of the arms K K.

Having thus described my invention, what I claim, and desire to secure by Letters Patent, is—

1. A friction-clutch consisting of two halves or segments of a ring, in combination with wedges arranged to force the ends of the segments apart to increase the circumference and diameter and force the ring into contact with the friction-surface A' of the pulley A, bow-springs P attached to the ends of the segments whose constant force is to bring the segments together, and coiled springs acting upon the segments at a point between their ends, substantially as and for the purpose described.

2. A friction-clutch consisting of two halves or segments of a circle forming a clutch, wedges E arranged as described, to increase the diameter and produce friction-contact with the inner surface of the friction-ring A' of the pulley A, bow-springs attached to the ends of the halves or segments and midway between their ends, coiled springs R producing a constant spring-pressure toward the center, substantially as and for the purpose described.

L. M. JOHNSTON.

Witnesses:
RUDOLPH ROEMHILDT,
ALBERT M. SULLIVAN.